United States Patent [19]
Hedderly et al.

[11] Patent Number: 6,152,489
[45] Date of Patent: Nov. 28, 2000

[54] INTEGRATED STEERING COLUMN AND INSTRUMENT PANEL STRUCTURE APPARATUS

[75] Inventors: Gregory Thomas Hedderly, White Lake; Robert Daniel Restauri, Madison Heights; Michael Patrick Rodgers, Farmington Hills; William L. Fisher, Dexter; Kumar Balakrishna Kulkarni, Ann Arbor; Thomas Junior Luckett, Saline; William Francis Weber, Bloomfield Hills, all of Mich.

[73] Assignee: Visteon Global Technologies, Inc., Dearborn, Mich.

[21] Appl. No.: 09/392,889

[22] Filed: Sep. 9, 1999

[51] Int. Cl.$^7$ ........................................................ B62D 1/16
[52] U.S. Cl. ............................................ 280/779; 280/775
[58] Field of Search ...................................... 280/775, 779

[56] References Cited

U.S. PATENT DOCUMENTS

| | | |
|---|---|---|
| D. 256,018 | 7/1980 | Stone et al. . |
| D. 342,712 | 12/1993 | Emoto . |
| D. 363,053 | 10/1995 | Abele . |
| 1,795,567 | 3/1931 | Maurice . |
| 4,432,565 | 2/1984 | Suzuki et al. ............................. 280/779 |
| 4,541,298 | 9/1985 | Strutt ........................................ 280/775 |
| 5,238,296 | 8/1993 | Tanaka et al. ........................... 280/779 |
| 5,282,637 | 2/1994 | McCreadie ............................... 280/779 |
| 5,606,892 | 3/1997 | Hedderly . |
| 5,737,971 | 4/1998 | Riefe et al. . |
| 5,813,288 | 9/1998 | Simonetti . |
| 5,934,733 | 8/1999 | Manwaring .............................. 280/779 |

FOREIGN PATENT DOCUMENTS

| | | |
|---|---|---|
| 2 230 775 | 1/1974 | Germany . |
| 301312 | 8/1954 | Switzerland . |

*Primary Examiner*—Kenneth R. Rice
*Attorney, Agent, or Firm*—Brooks & Kushman P.C.

[57] ABSTRACT

A vehicle includes first and second A-pillars with a cross-car beam connecting the first and second A-pillars. A steering column assembly is positioned within the vehicle and includes at least one pivot joint. A single attachment component directly connects the pivot joint to the cross-car beam.

6 Claims, 24 Drawing Sheets

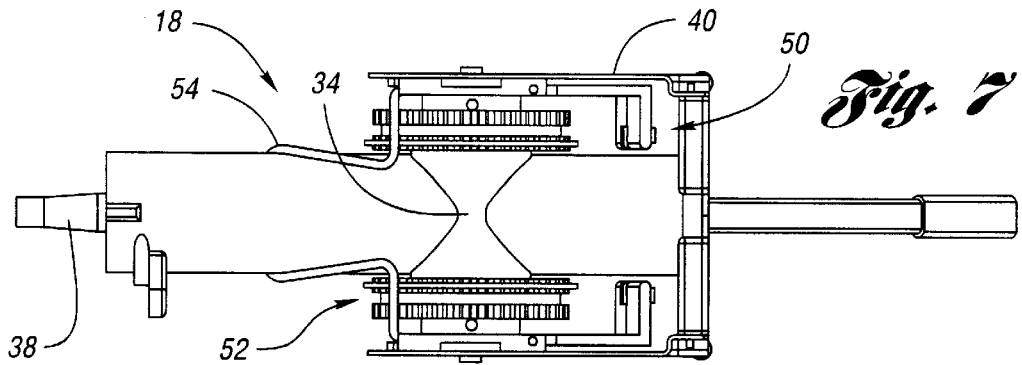
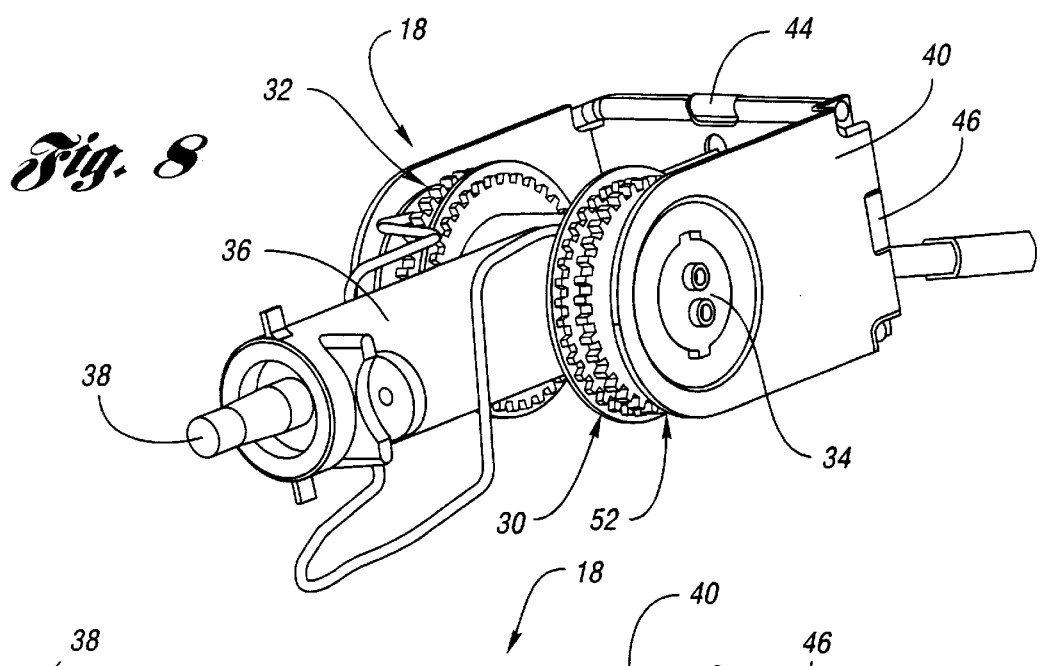
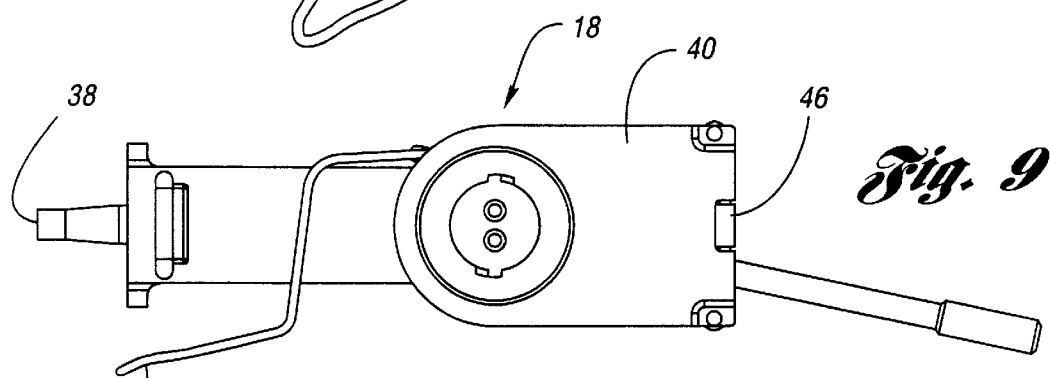
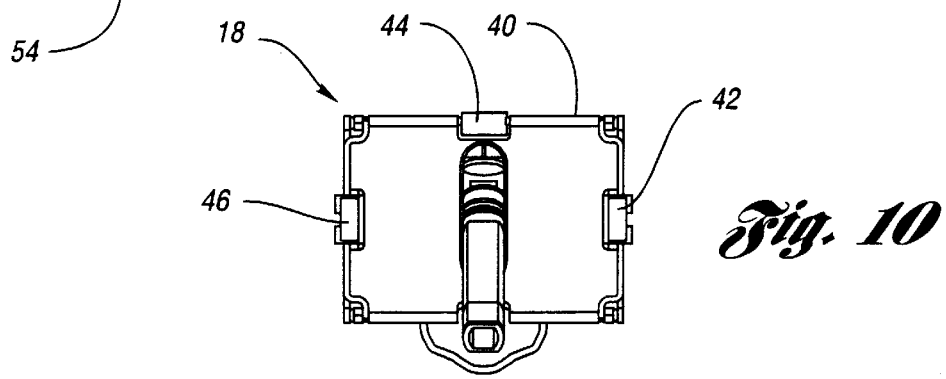

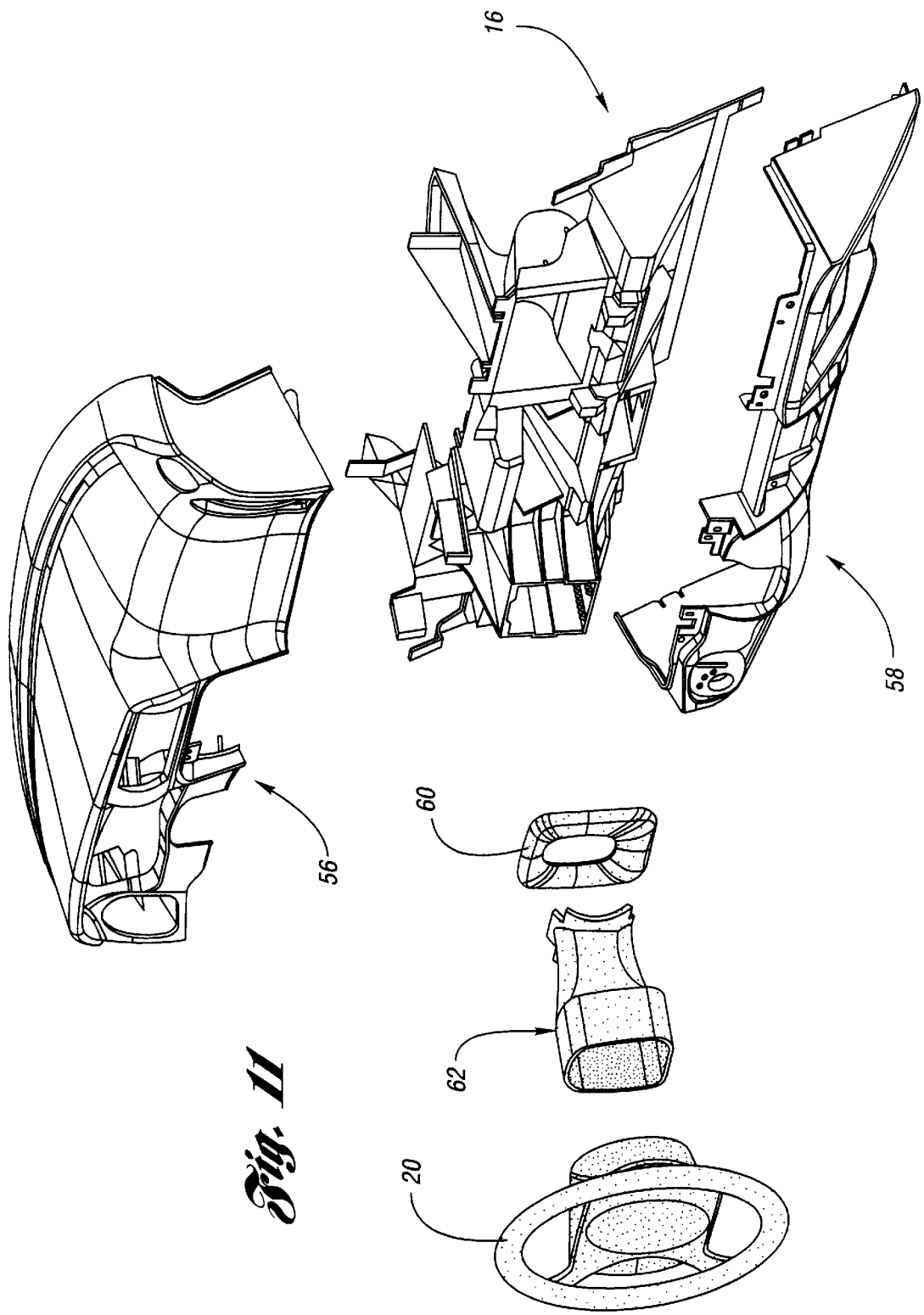

INTEGRATED STEERING COLUMN AND INSTRUMENT PANEL STRUCTURE APPARATUS

TECHNICAL FIELD

The present invention relates to a vehicle having a steering column assembly integrated with a cross-car beam of the vehicle.

BACKGROUND OF THE INVENTION

Typically, vehicle steering column assemblies are complex structures requiring multiple assembly steps for installation in a vehicle.

In some designs, the steering column assembly is bracketed to the cross-car beam, which extends between A-pillars of the vehicles for providing structural integrity. In such designs, the steering column assembly is assembled independently within its own housing, and then bracketed to the cross-car beam by means of one or more bracketing components.

It is desirable to simplify the assembly process while reducing the number of parts required, thereby reducing costs.

DISCLOSURE OF THE INVENTION

The present invention overcomes the above-referenced shortcomings of prior art assemblies by integrating a steering column assembly with the cross-car beam. Various embodiments of the invention are provided. For example, the cross-car beam itself may form the housing for the steering column, or a single attachment component may directly connect a pivot joint of the steering column assembly to the cross-car beam.

More specifically, the present invention provides a vehicle having first and second A-pillars, and including a cross-car beam connecting the first and second A-pillars of the vehicle. A steering column armature assembly is positioned within the vehicle and includes at least one pivot joint. A single attachment component directly connects the pivot joint to the cross-car beam.

The single attachment component may be operative as a steering column housing while attaching the pivot joint to the cross-car beam, which eliminates the need for extra attachment brackets. Alternatively, the cross-car beam may include an aperture formed therethrough for receiving the steering column armature assembly. In such an embodiment, the single attachment component would include a gear pivotally connected coaxially with the pivot joint and having gear teeth engaged with a gear rack formed integrally with the cross-car beam for pivotally mounting the pivot joint with respect to the cross-car beam.

Accordingly, an object of the invention is to provide an improved vehicle assembly in which the steering column armature assembly is integrally attached with the cross-car beam by a single attachment component, thereby reducing part count and simplifying the assembly process.

Other objects, features and advantages of the present invention are readily apparent from the following detailed description of the best modes for carrying out the invention when taken in connection with the accompanying drawings.

BRIEF DESCRIPTION OF THE DRAWINGS

FIG. 7 shows a plan view of a steering column armature assembly in accordance with the present invention;

FIG. 8 shows a perspective view of the assembly of FIG. 7;

FIG. 9 shows a side view of the assembly of the FIG. 7;

FIG. 10 shows an end view of the assembly of FIG. 7;

FIG. 11 shows an exploded perspective view of an instrument panel assembly and cross-car beam in accordance with the present invention;

DETAILED DESCRIPTION OF THE PREFERRED EMBODIMENTS

Figure 1:
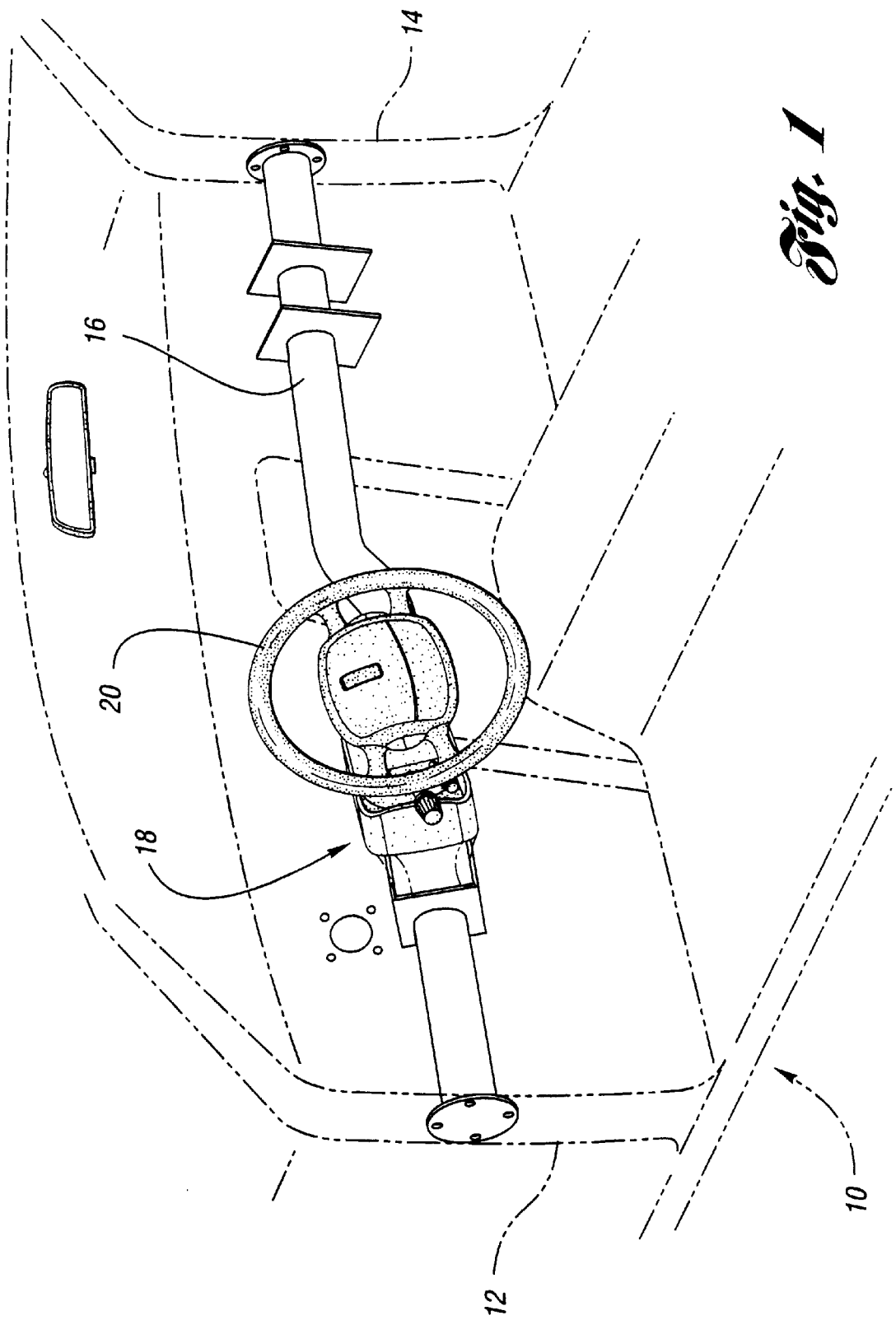
FIG. 1 shows a schematic perspective view of a cross-car beam and steering column assembly in accordance with the present invention.

FIG. 1 shows a schematic perspective view of a vehicle 10 in accordance with the present invention. The vehicle 10 includes A-pillars 12,14, with a cross-car beam 16 connecting the A-pillars 12,14. A steering column armature assembly 18 is integrated with the cross-car beam 16 for mounting a steering wheel 20 in the vehicle.

Figure 2:
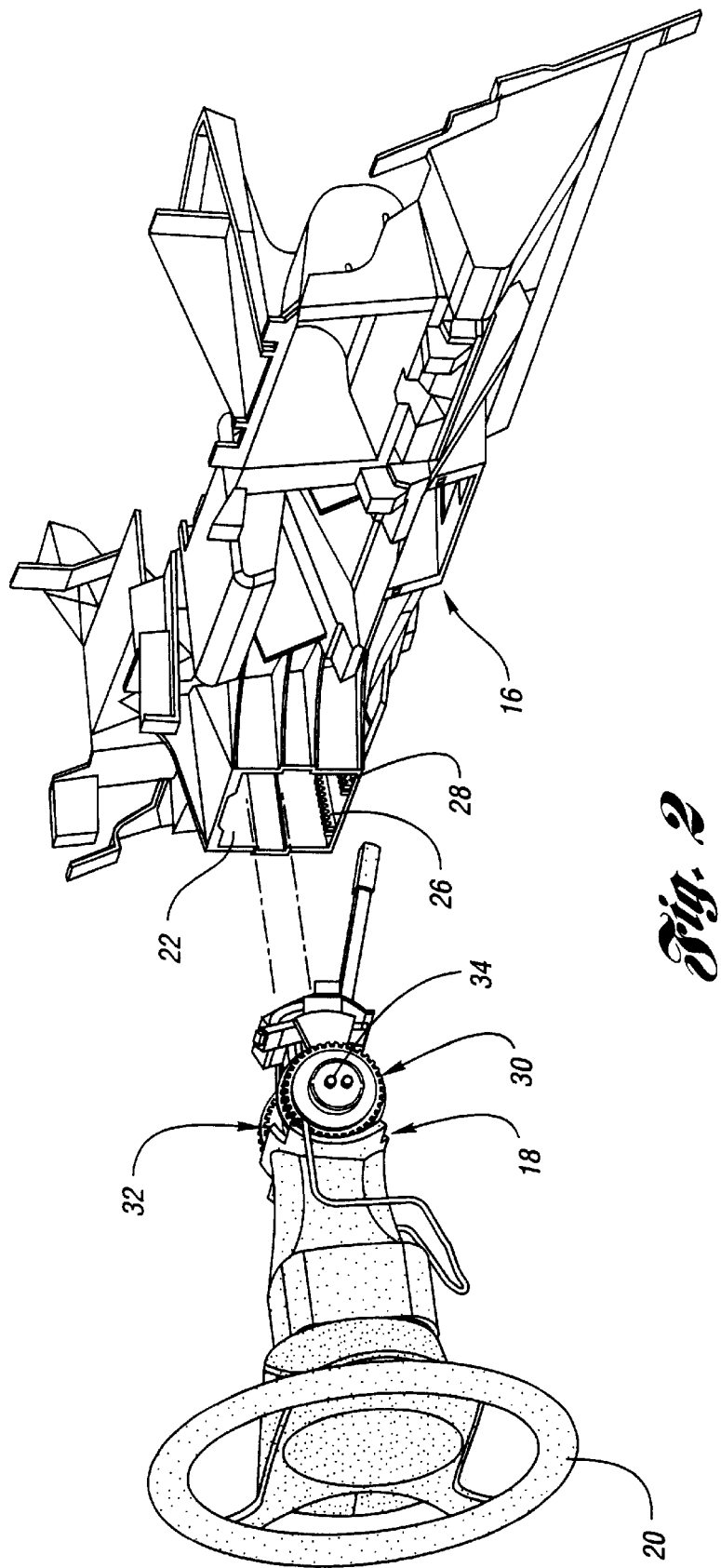
FIG. 2 shows an exploded perspective view of a cross-car beam and steering column assembly in accordance with the present invention.
Figure 3:
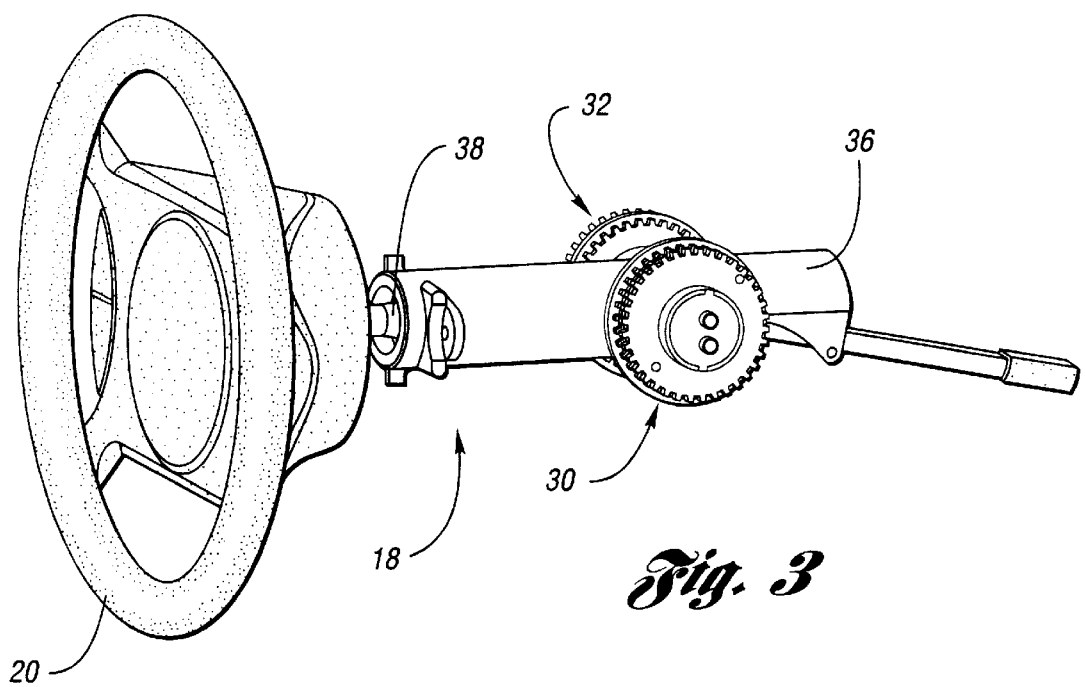
FIG. 3 shows a perspective view of a partially disassembled steering column armature assembly in accordance with the present invention.
Figure 4:
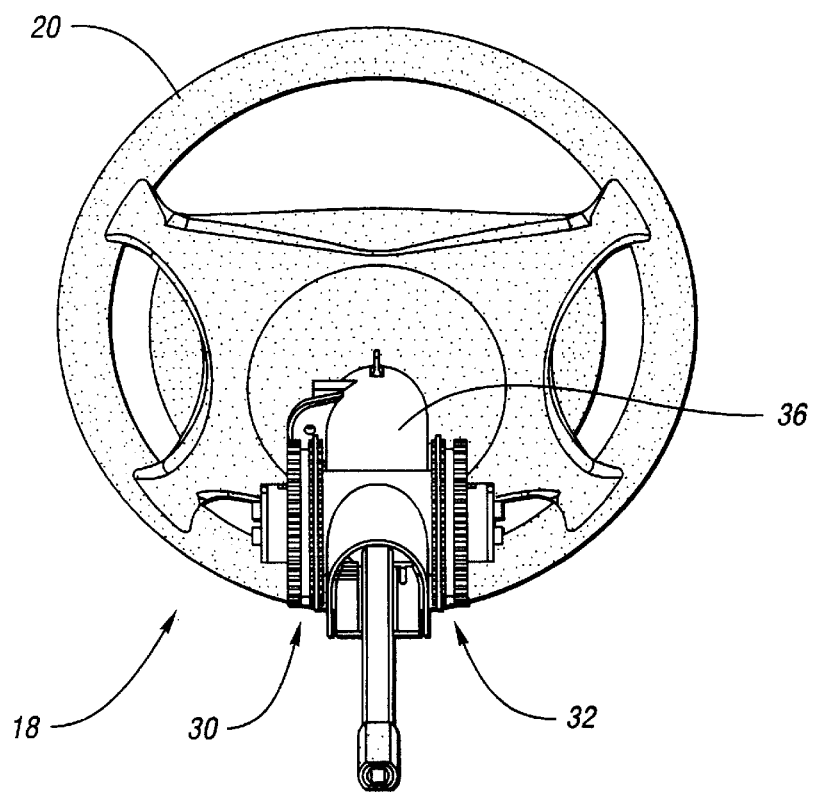
FIG. 4 shows an end perspective view of the assembly of FIG. 3.
Figure 5:
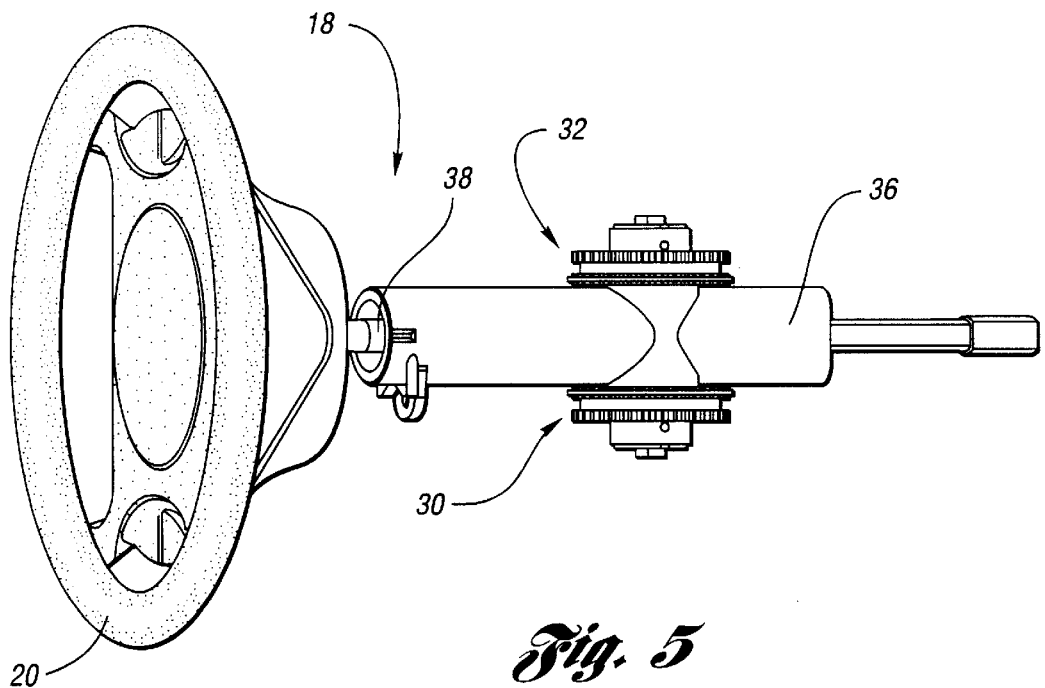
FIG. 5 shows a top perspective view of the assembly of FIG. 3.
Figure 6:
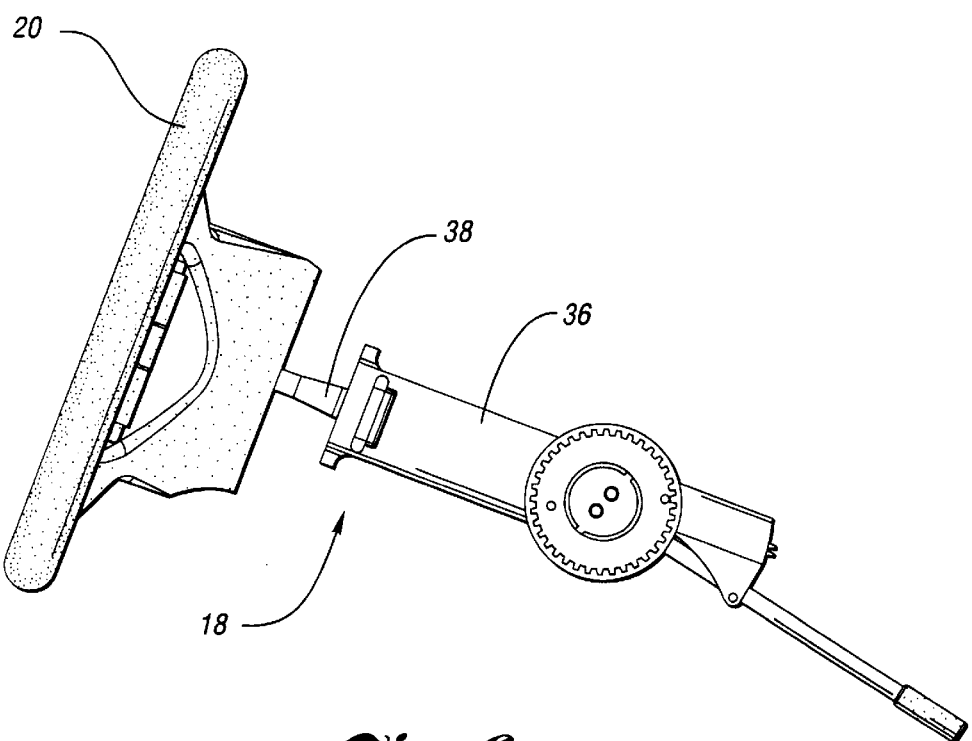
FIG. 6 shows a side view of the assembly of FIG. 3.

In the preferred embodiment of the invention shown in FIG. 2, a partially disassembled steering column armature assembly 18 is shown prior to installation within an aperture 22 formed in the cross-car beam 16. Preferably, the cross-car beam 24 is a cast component, wherein the aperture 22 is cast integrally therein, and the gear racks 26,28 are formed on upper and lower sides of the aperture 22. The gear racks 26,28 at the upper and lower edges of the aperture 22 are configured to engage the gear sets 30,32 of the steering column armature assembly 18 such that the steering column armature assembly 18 may be telescopically adjusted with respect to the aperture 22 by moving the gear sets 30,32 along the gear racks 26,28. In this configuration, a single gear of the gear sets 30,32 may act as a single attachment component for directly connecting the pivot joint 34 of the partially disassembled steering column armature assembly 18 to the cross-car beam 16.

FIGS. 3–6 show various views of the partially disassembled steering column armature assembly 18, which includes the gear sets 30,32 and armature 36 which houses the steering column 38.

Figure 15:
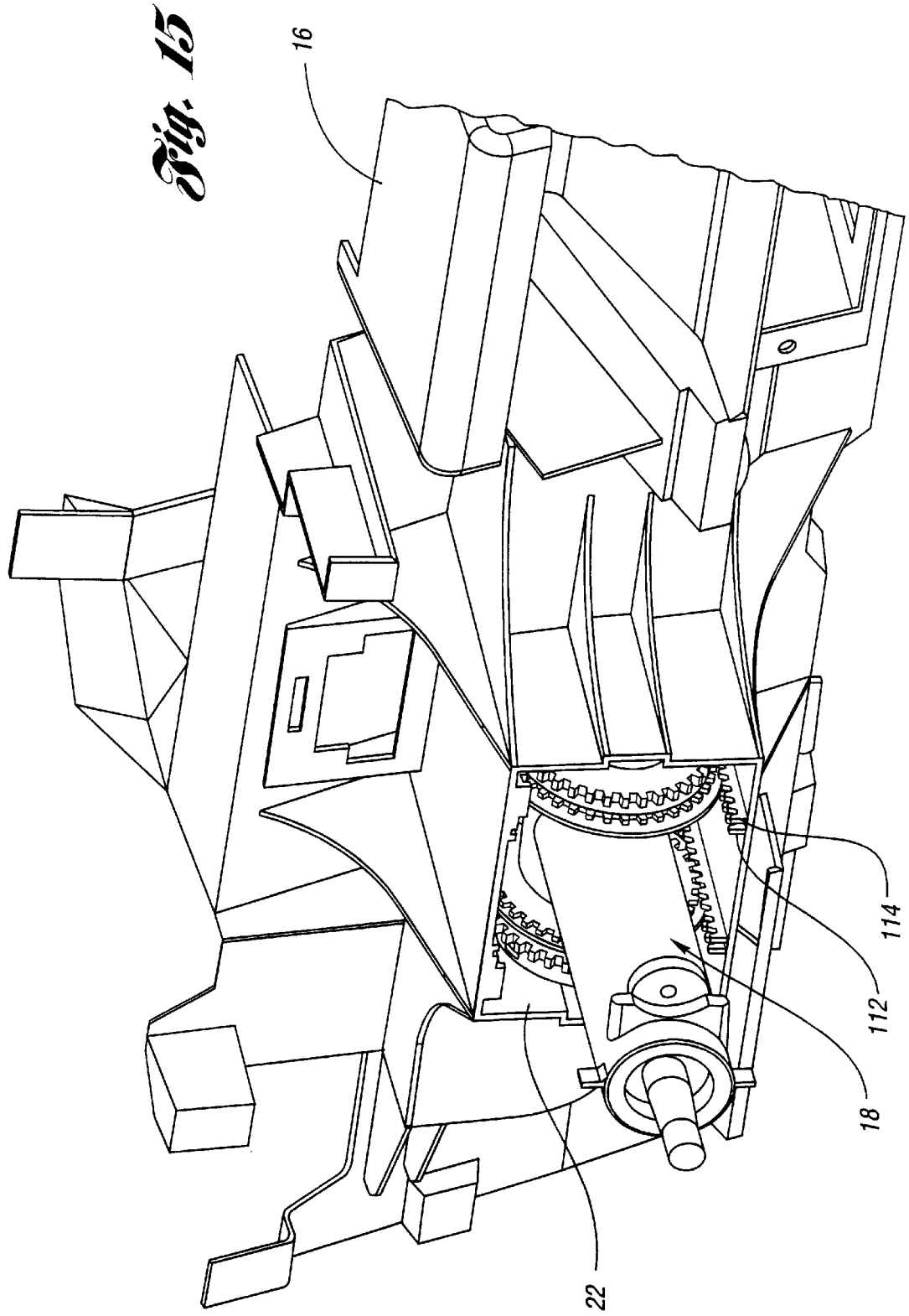
FIG. 15 shows a partial perspective view of the steering column armature assembly shown in FIG. 7 received within the cross-car beam structure shown in FIG. 13.

FIGS. 7–10 show the fully assembled steering column armature assembly 18. As shown, the steering column armature assembly 18 includes a housing 40 having rollers 42,44,46 for rolling movement within the aperture 22 of the cross-car beam 16, as shown in FIG. 15. The steering column armature assembly 18 shown in FIGS. 7–10 is a self-contained assembly, including tilting, telescoping and energy absorption features incorporated therein. The steering column armature 36 is pivotable about the pivot joint 34 when unrestricted by the tilt locking feature 50, to be described below. Also, the entire steering column armature assembly is movable along the aperture 22 for telescoping adjustment when unrestricted by the telescope locking feature 52, which is incorporated within the gear sets 30,32, to be described below.

A single bail handle 54 is operatively connected to the tilt locking feature 50 and to the telescope locking feature 52 for selectively disengaging the tilt locking feature and telescope locking feature for adjustment of the steering column 38.

FIG. 11 shows an exploded view of various instrument panel and column components, including the upper instrument panel substrate 56 and lower instrument panel substrate 58, which cooperate to enclose the cross-car beam 16. Also, a grommet 60 and shroud assembly 62 are provided for enclosing the steering column assembly.

Figure 12:
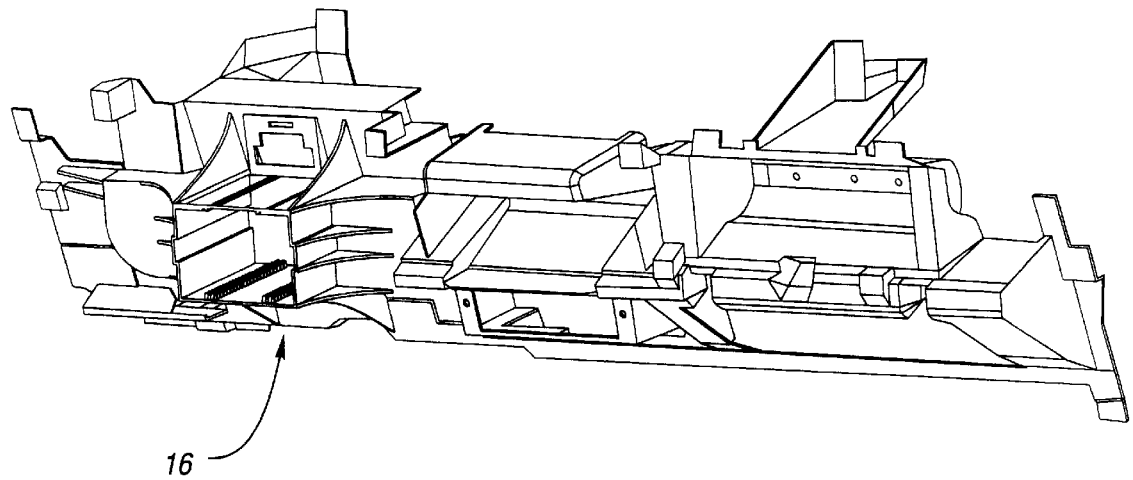
FIG. 12 shows a perspective view of a cross-car beam in accordance with the present invention.
Figure 13:
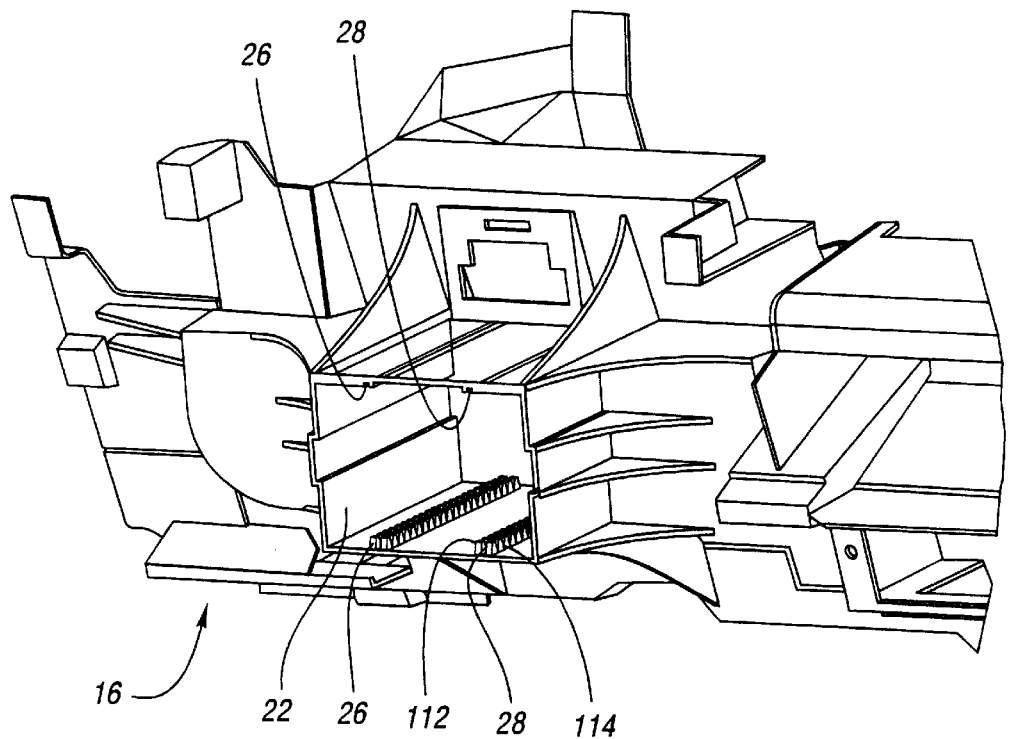
FIG. 13 shows an enlarged partial perspective view of the cross-car beam shown in FIG. 12.

FIGS. 12 and 13 show additional perspective views of the cross-car beam 16. In FIG. 13, the upper and lower gear racks 26,28 of the aperture 22 are clearly visible.

Figure 14:
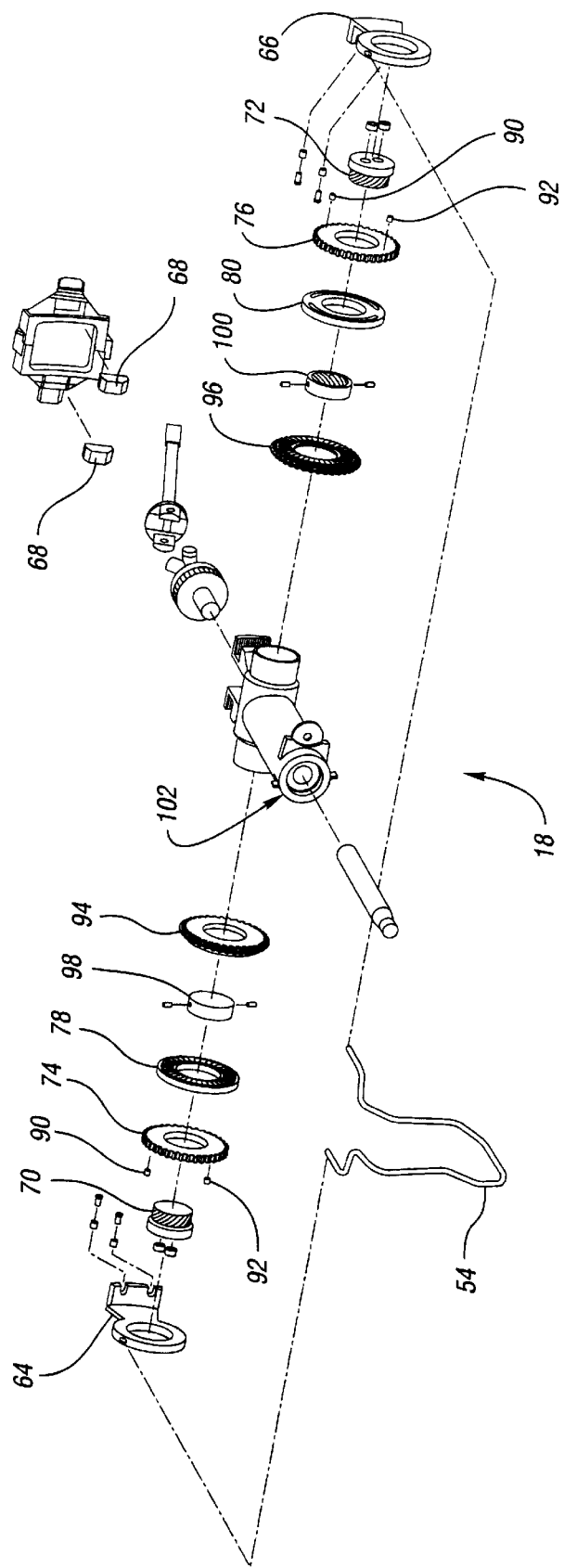
FIG. 14 shows an exploded view of the assembly as shown in FIG. 7.
Figure 24:
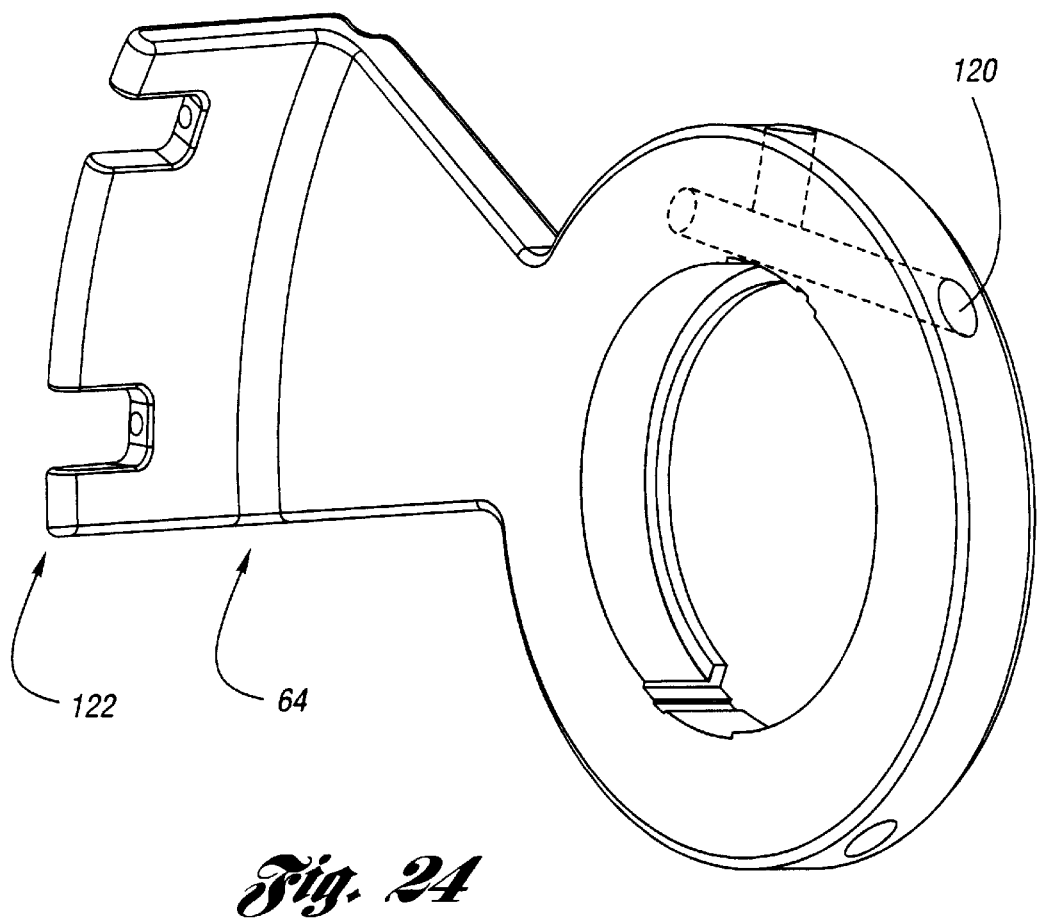
FIG. 24 shows a perspective view of a tilt locking feature in accordance with the present invention.
Figures 25, 25A:
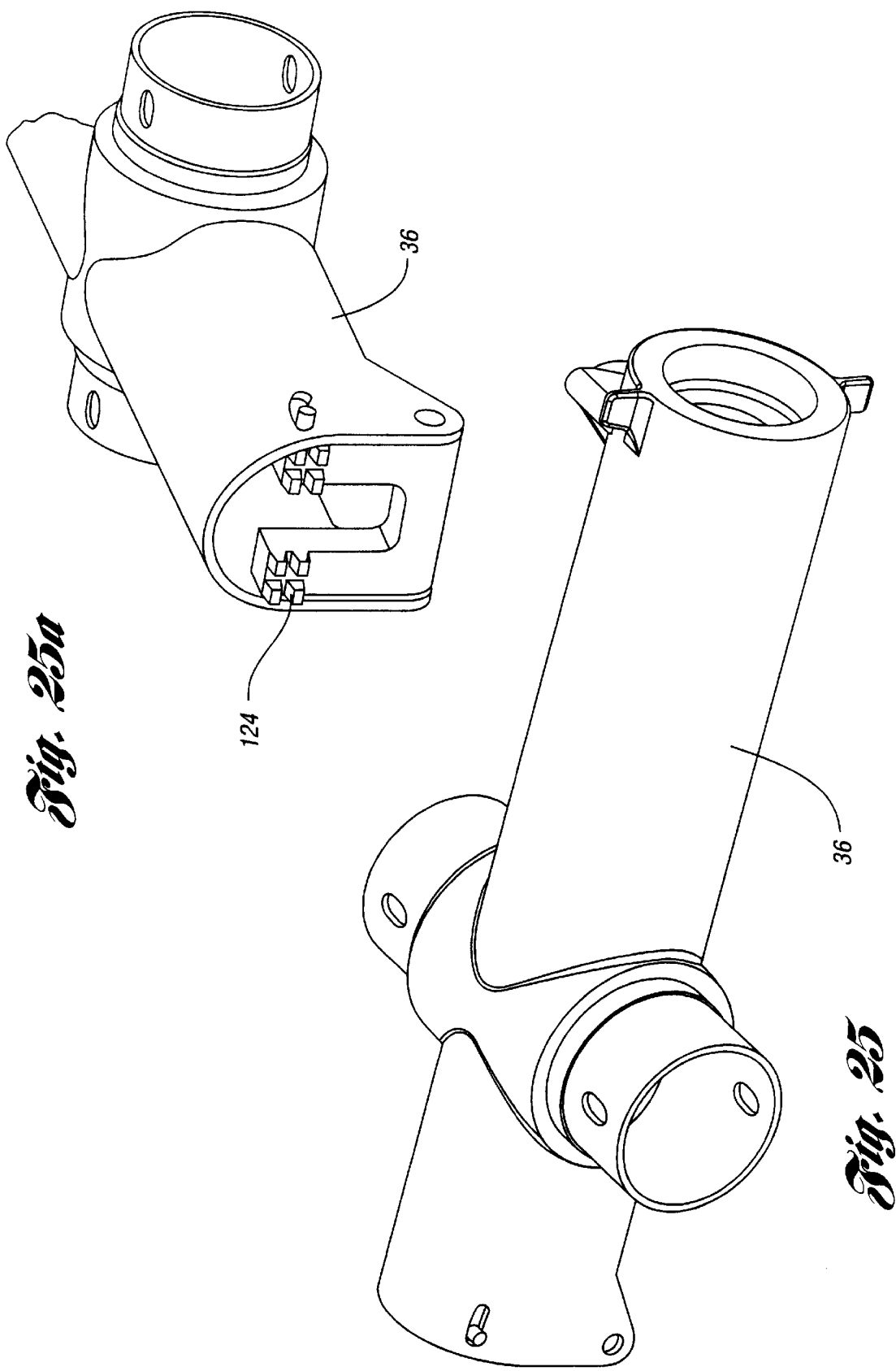
FIG. 25 shows a perspective view of a steering column armature in accordance with the present invention.
FIG. 25a shows a reverse partial perspective view of the armature of FIG. 25.
Figure 26:
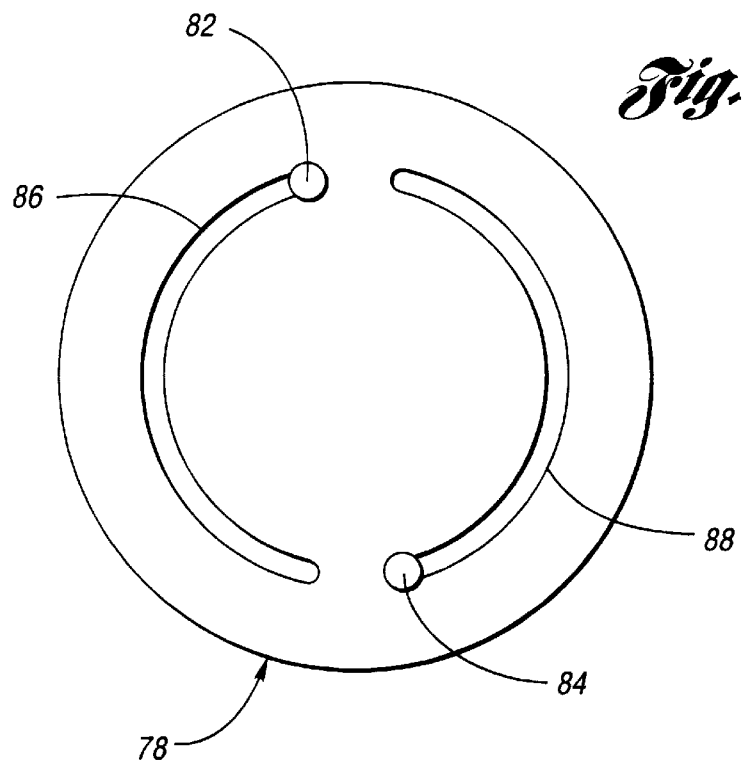
FIG. 26 shows a plan view of a clutch in accordance with the present invention.

The functionality of the steering column armature assembly 18 is most clearly understood with reference to the exploded view of FIG. 14. The single handle 54 is connected to the actuator locks 64,66, which cooperate with the bulkhead stabilizer teeth 68. As shown in FIG. 24, the actuator lock 64 has an aperture 120 for receiving the single handle 54, and a locking end 122 which cooperates with the lock teeth 124 and stabilizer teeth 68 of the armature assembly 36, shown in FIG. 25, to form the tilt locking feature 50. The hub drivers 70,72 are connected to the respective first gears (outer gears) 74,76, respectively, and to the actuator locks 64,66. A clutch 78,80 is secured to each first gear 74,76. As shown in FIG. 26, each clutch 78,80 includes two enlarged holes 82,84 with corresponding energy dissipating slots 86,88. Pins extending from the respective first gear 74,76 engage within the holes 82,84, and are forced through the energy dissipating slots 86,88 in a crash situation for energy dissipation when the clutch 78,80 is forced to rotate with respect to the respective first gear 74,76. The pins 90,92 engageable within the holes 82,84 are shown in FIG. 14.

Figure 22:
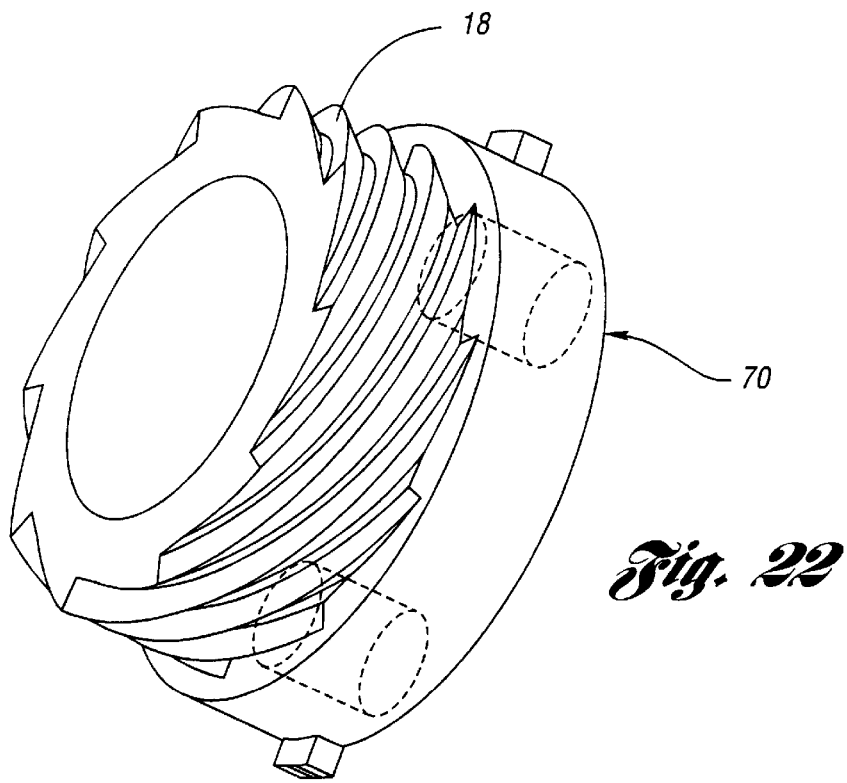
FIG. 22 shows a perspective view of a hub driver in accordance with the present invention.
Figure 23:
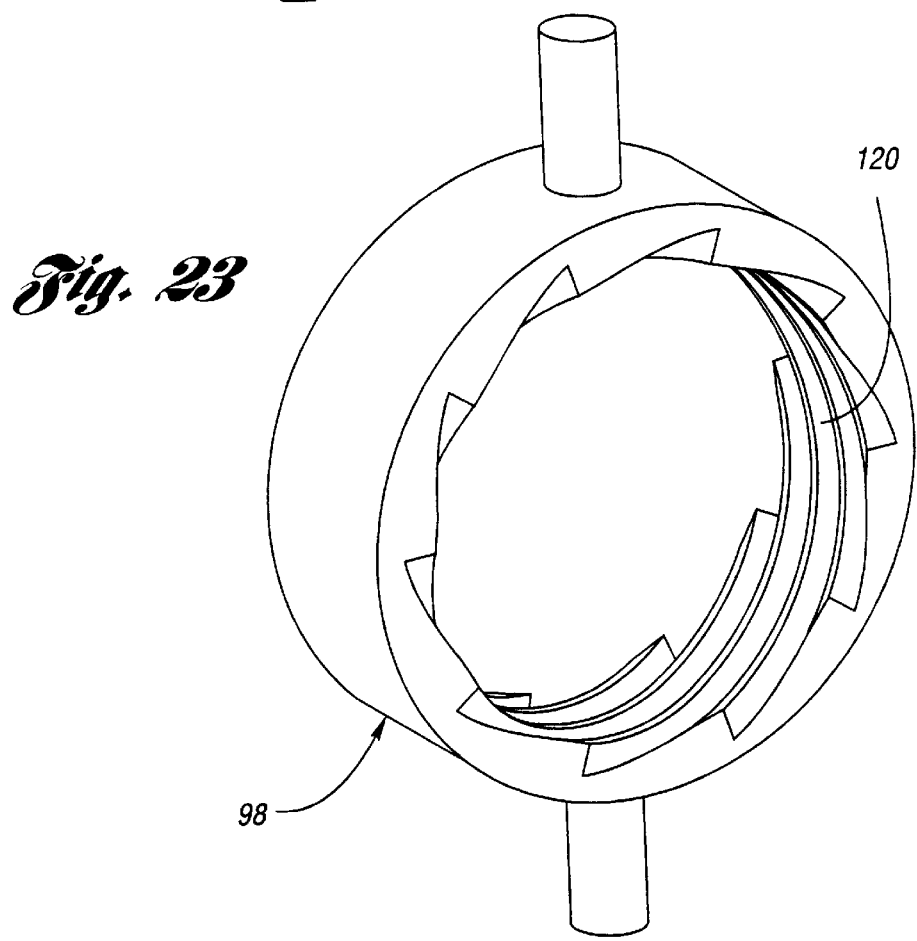
FIG. 23 shows a perspective view of a driven hub engageable with the hub driver of FIG. 22.

The second gears (inner gears) 94,96 are attached to the driven hubs 98,100, and assembled to the armature 102. A hub driver 70 and driven hub 98 are shown in FIGS. 22 and 23. Severely canted mating threads 118,120 are provided to enable the fast lead operation. Preferably, the hub driver 70 and driven hub 98 are molded components.

When the single handle 54 is rotated approximately 20 degrees, the actuator locks 64,66 and fast lead hub drivers 70,72 also rotate 20 degrees. With this rotation, the driven hubs 98,100 move approximately 0.125 inch, taking the inner gears 94,96 with them. This unlocks the actuator locks 64,66 from the bulkhead stabilizer teeth 68. At this point, only column tilt can be adjusted.

Figure 18:
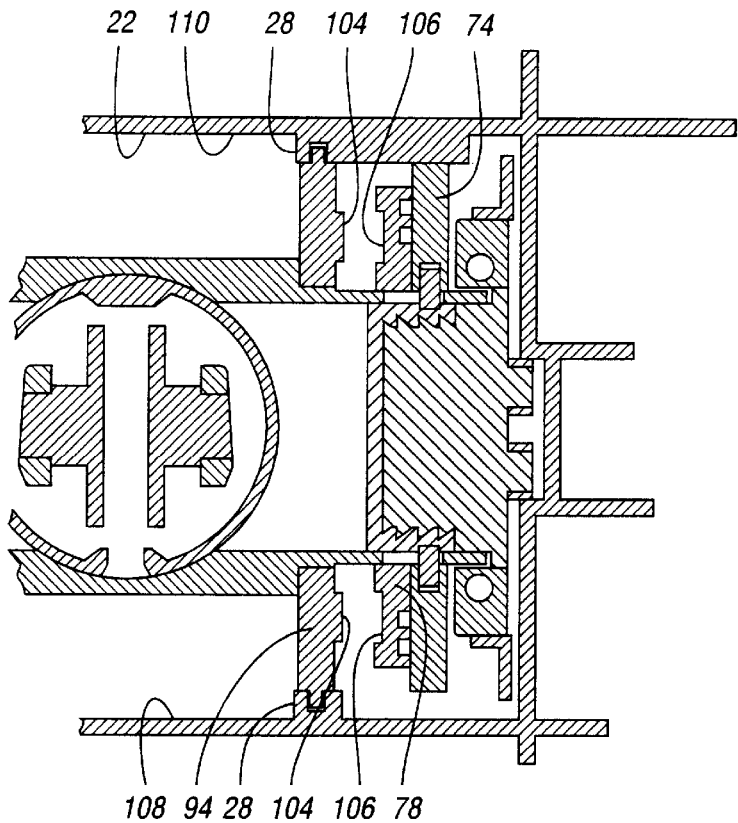
FIG. 18 shows a vertical cross-sectional view of the assembly of FIG. 16.

When the single handle 54 is rotated approximately 20 degrees more for a total of 40 degrees, the actuator locks 64,66 and fast lead screw hub drivers 70,72 also rotate 20 degrees more. With this rotation, the driven hubs 98,100 move approximately 0.125 inch more, taking the inner gears 94,96 with them. At this point, as shown in FIG. 18, the side teeth 104 of the inner gear 94 are now spaced away from the side teeth 106 of the clutch 78, thereby allowing free counter-rotation of the inner gear 94 with respect to the attached clutch 78 and outer gear 74. This counter-rotation is facilitated by the inner gear 94 being engaged only with the rack 28 at the bottom 108 of the aperture 22, and the outer gear 74 being engaged only at the rack 28 at the top 110 of the aperture 22. The opposite edge of each of the gears 74,94 is provided with clearance from the opposing aperture wall. Accordingly, with the gear teeth of the inner gear 94 only engaged at the bottom, and the gear teeth of the outer gear 74 only engaged at the top, telescoping movement of the steering column assembly occurs by means of counter-rotation of the gears 74,94. At this point of 40 degrees of handle 54 movement, only column telescope can be adjusted.

Figure 16:
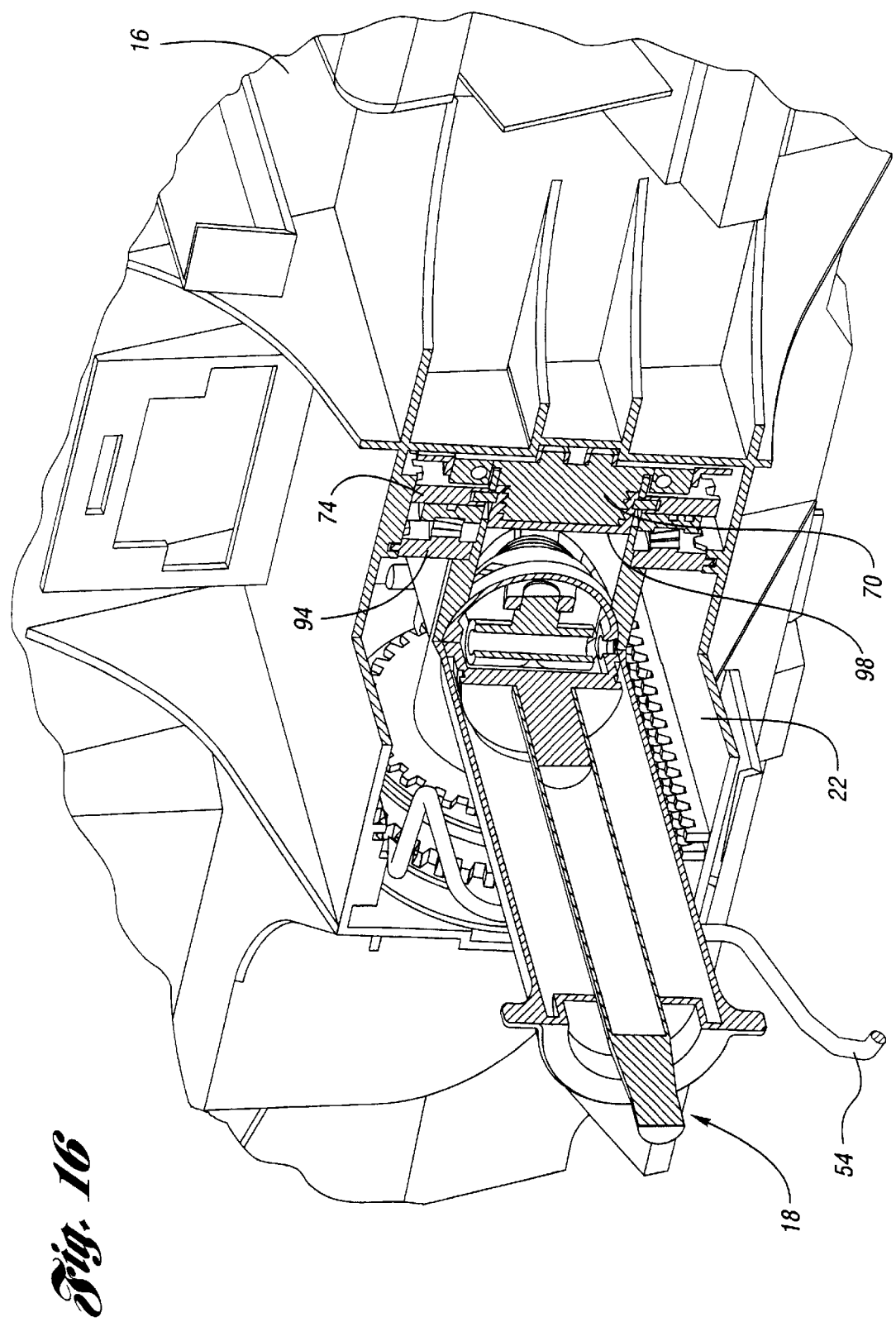
FIG. 16 shows a cut-away perspective view of the assembly of FIG. 15 with the telescope assembly in the unlocked position.
Figure 17:
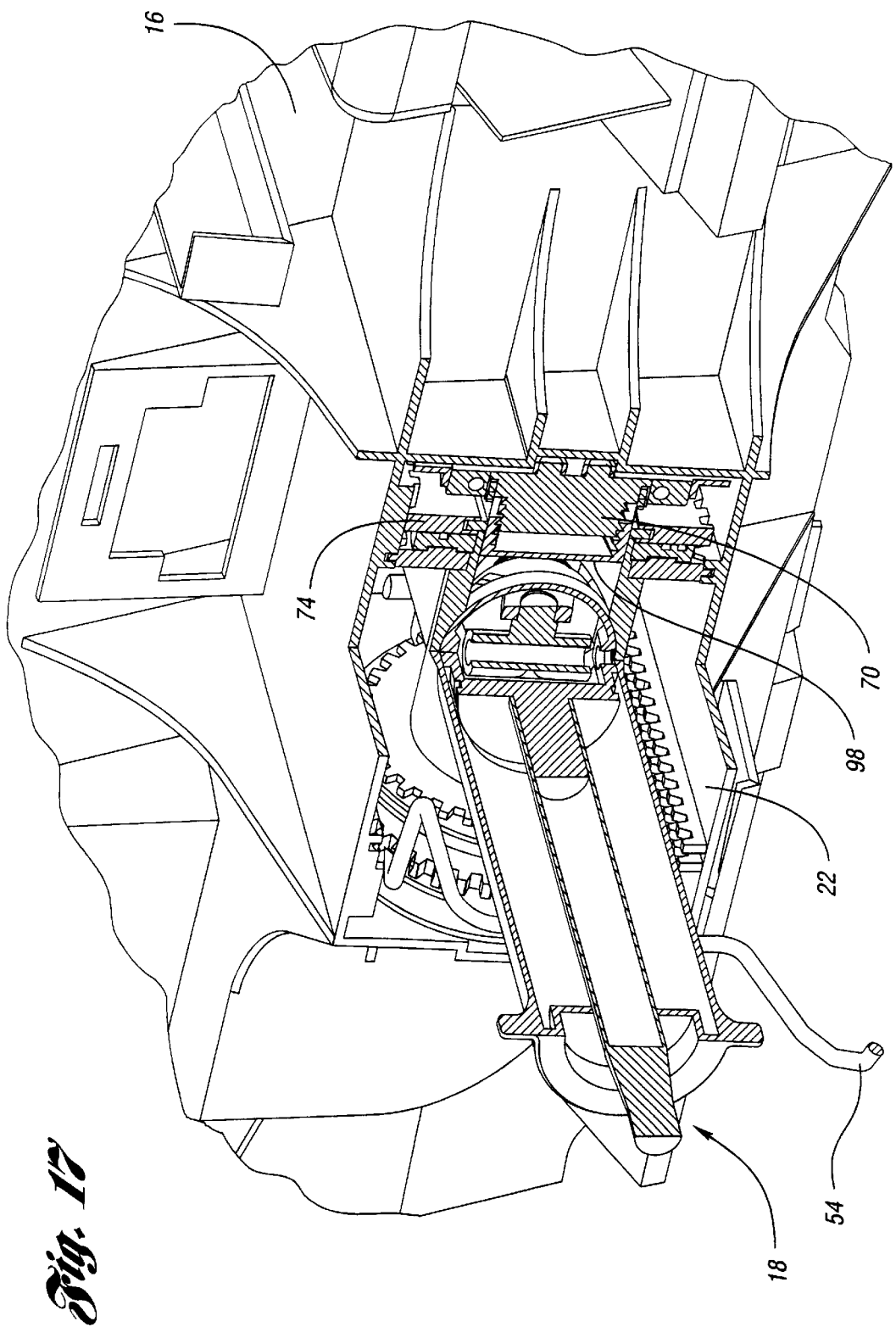
FIG. 17 shows a cut-away perspective view of the assembly of FIG. 15 with the telescope assembly in the locked position.
Figure 19:
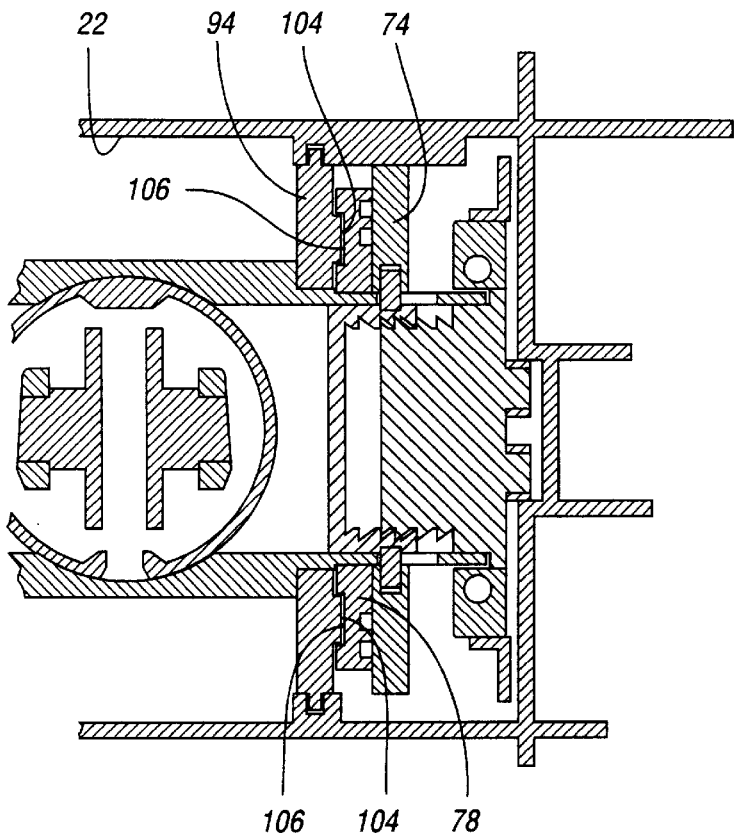
FIG. 19 shows a vertical cross-sectional view of the assembly of FIG. 17.

Moving the single handle 54 back 40 degrees reverses the hub drivers 70,72 and re-engages the side teeth 104,106 of the inner gear 94 and clutch 78, thereby locking in the newly-selected tilt and telescope positions. This locked position is shown in FIGS. 17 and 19, with FIGS. 16 and 18 illustrating the unlocked position. As shown in FIG. 19, the face teeth 104,106 of the inner gear 94 and clutch 78 are engaged, thereby preventing counter-rotation of the inner gear 94 and outer gear 74, preventing telescoping movement.

Returning to FIG. 13, the cross-car beam aperture 22 (receiver box) includes the gear racks 26,28. As shown, each gear rack 26,28 includes an outer row 114 and inner row 112 of teeth. The outermost teeth 114 engage the outer gear 74 at the bottom of the aperture 22, and the innermost teeth 112 engage the inner gear 94 at the top of the aperture 22. This gear arrangement stabilizes the column assembly.

Figure 20:
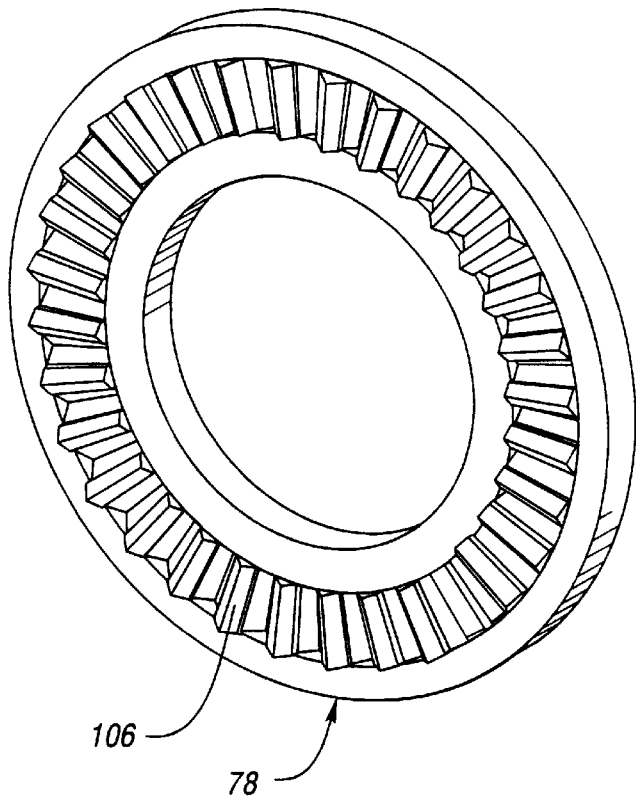
FIG. 20 shows a perspective view of a clutch in accordance with the present invention.
Figure 21:
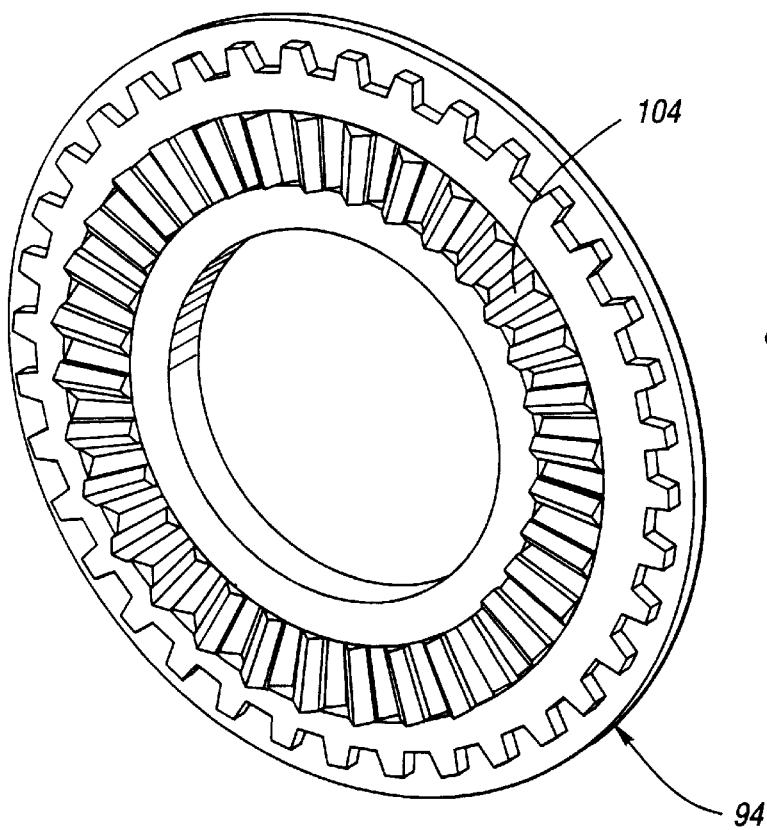
FIG. 21 shows a perspective view of a second gear engageable with the clutch of FIG. 20.

During the crash event, the side teeth 104,106 of the clutch 78 and inner gear 94 prevent relative rotation between the clutch 78 and inner gear 94. The engaging side teeth 104,106 of the clutch 78 and inner gear 94 are shown in FIGS. 20 and 21. However, the clutch 78 is pinned to the outer gear 74 by the pins 90,92 shown in FIG. 14. Turning to FIG. 26, the pins 90,92 engage within the holes 80,82 of the clutch 78. The holes 82,84 are larger than the corresponding slots 86,88, therefore the pins 90,92 stay in position under normal conditions. However, in a crash situation, the weak point is the energy dissipation slots 86,88 on the clutch 78. When sufficient axial force is exerted on the steering column, the outer gear 74 forcibly counter-rotates with respect to the inner gear 94, and the pins 90,92 deform the slots 86,88 of the clutch 78 and dissipate the energy. In an alternative embodiment, the pins 90,92 and slots 86,88 may be replaced with a pair of wires which are cold-formed by dragging the wires through bent slots during the crash event.

Figure 27:
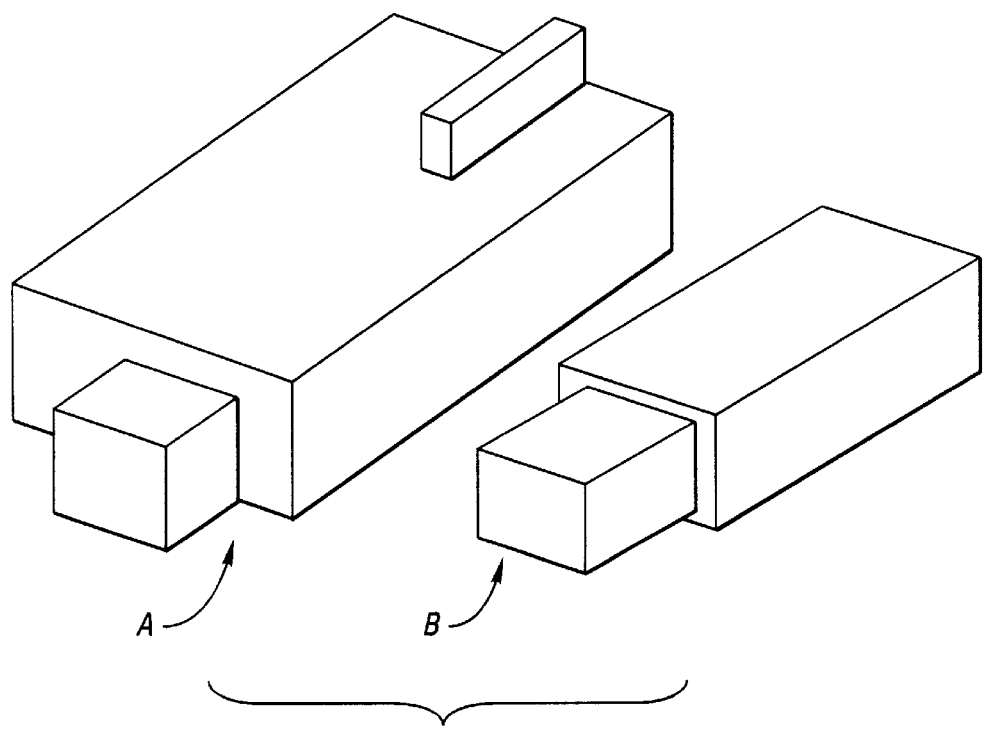
FIG. 27 shows a comparative schematic illustration of packaging space required by a prior art steering column assembly in comparison with the present invention.

FIG. 27 is a schematic illustration of the packaging space required by a sample prior art steering column assembly A in comparison with the packaging space required by the present steering column assembly B. As shown, the invention provides significant packaging space savings by incorporating tilt, telescope and energy dissipation features in the removable steering column armature assembly.

Figure 28:
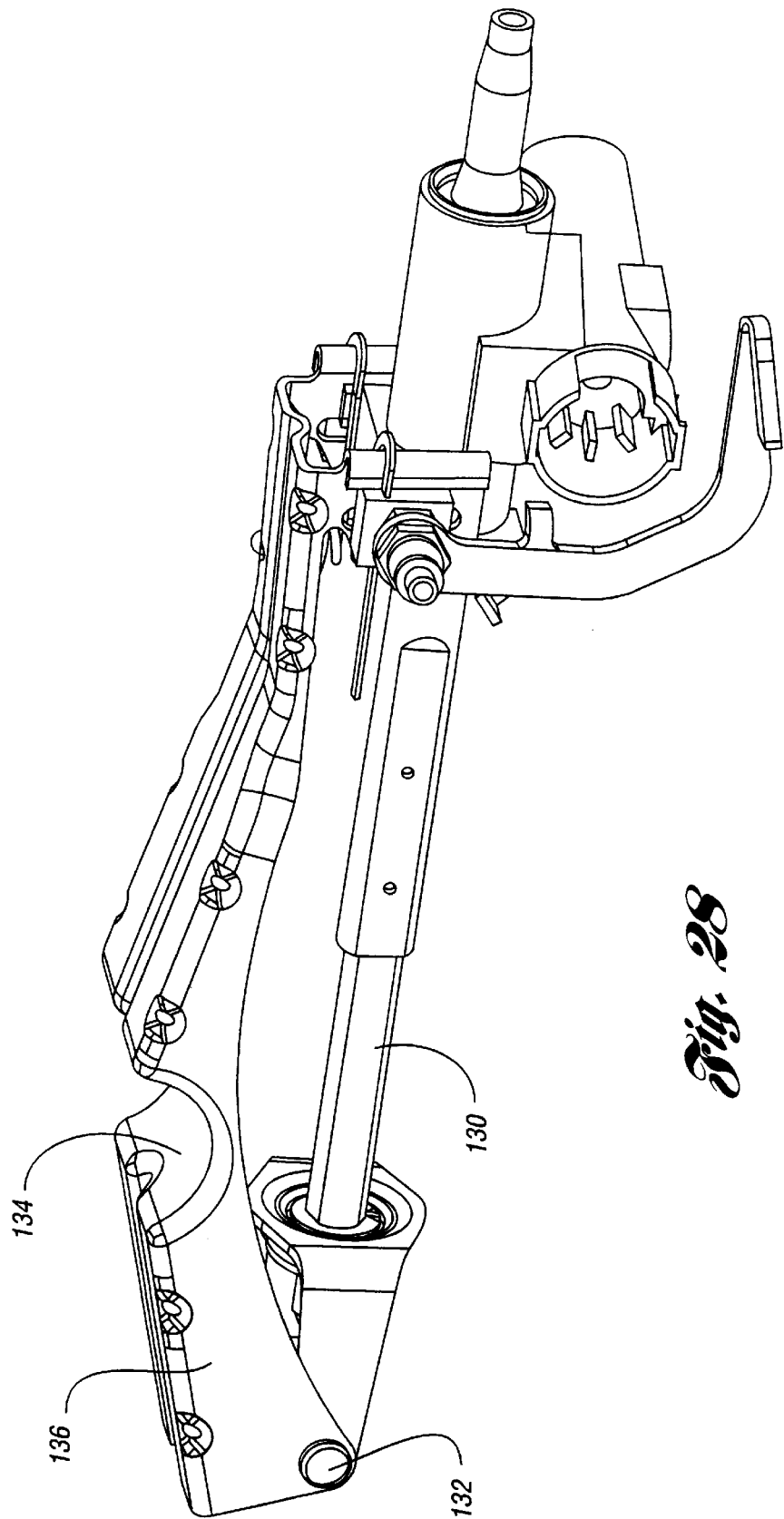
FIG. 28 shows a perspective view of a steering column assembly in accordance with an alternative embodiment of the present invention.
Figure 29:
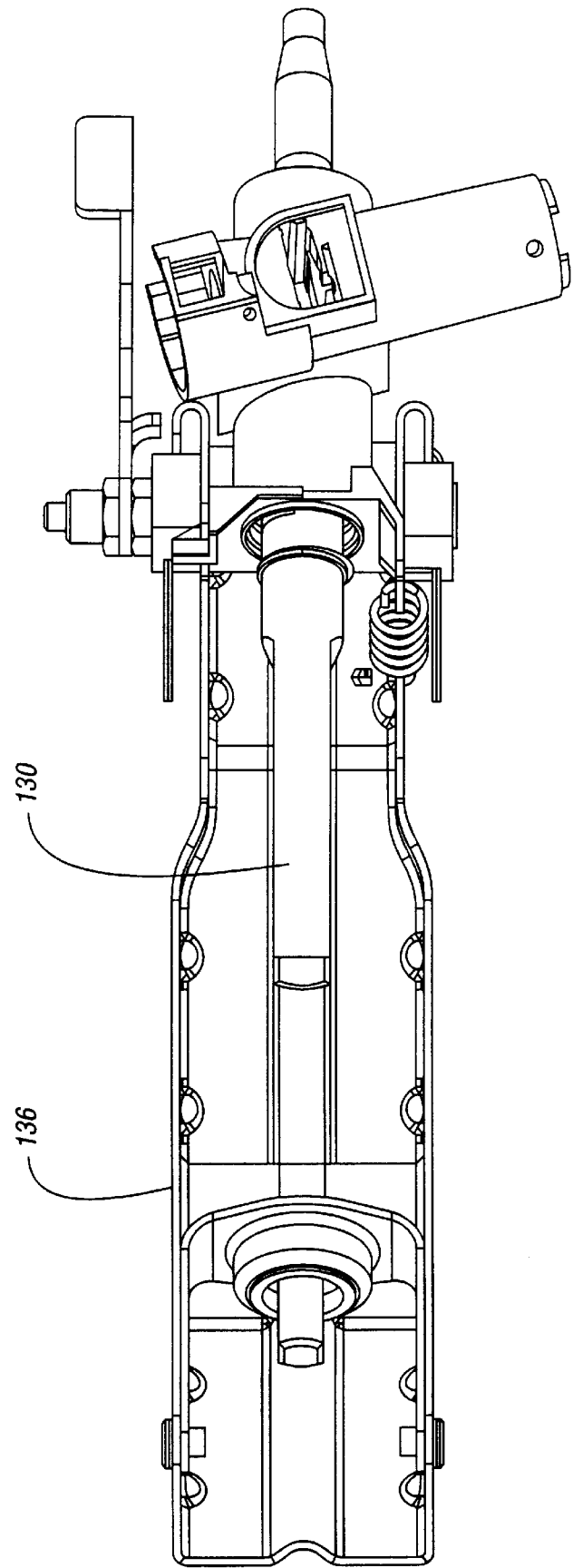
FIG. 29 shows an underside view of the assembly of FIG. 28.
Figure 30:
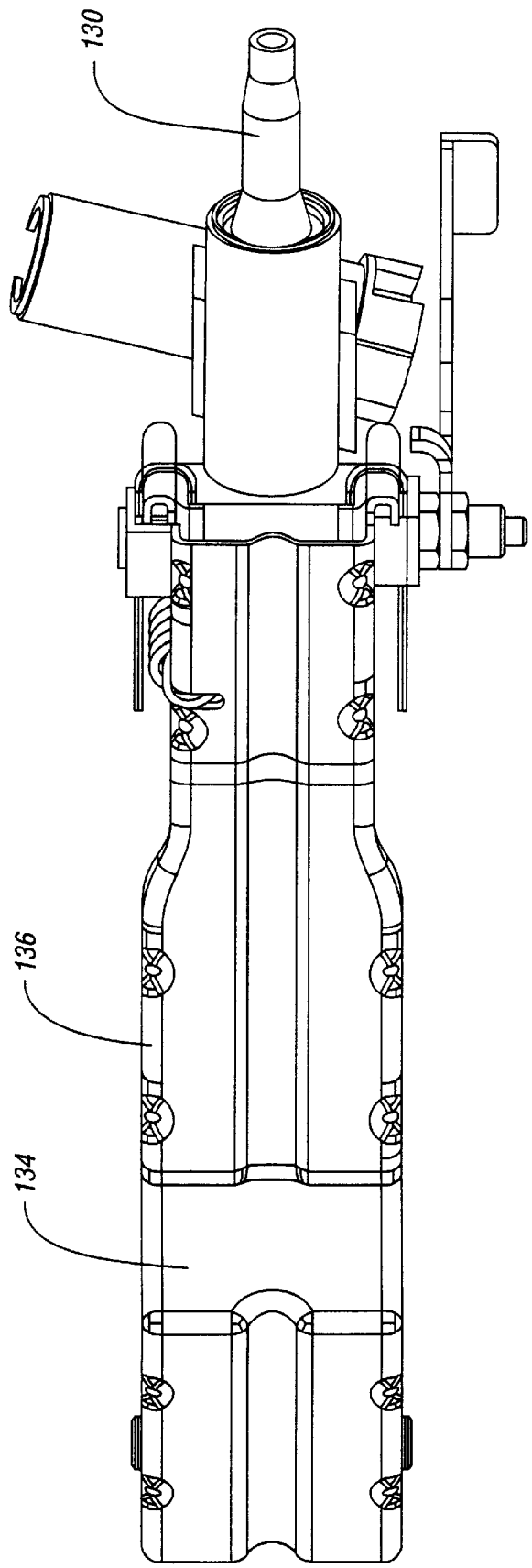
FIG. 30 shows a top view of the assembly of FIG. 28.
Figure 31:
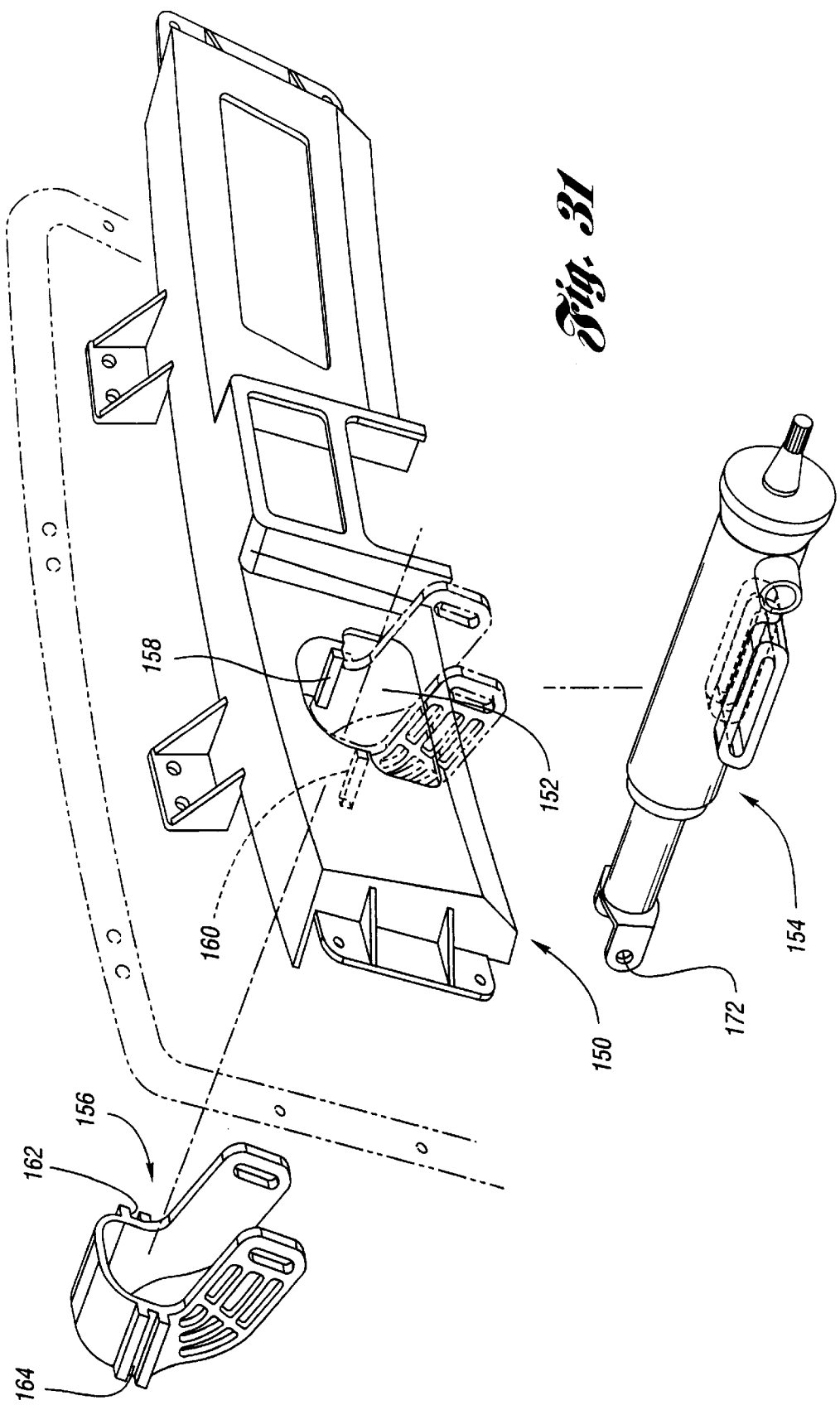
FIG. 31 shows a schematic, exploded, perspective view of a cross-car beam and steering column assembly in accordance with a second alternative embodiment of the invention.

Turning to FIGS. 28–30, an alternative steering column assembly is shown in which the steering column 130 includes a pivot joint 132 which is directly attached to a cross-car beam at an attachment location 134 of a single attachment component 136. Accordingly, the single attachment component 136 not only attaches the pivot joint 132 of the steering column 130 directly to the cross-car beam, but also acts as a housing for the steering column 30. In this manner, part count is reduced because no additional bracketing is required for attachment.

FIGS. 31–35 illustrate a second alternative embodiment of the invention wherein a cross-car beam 150 includes an aperture 152 for receiving a steering column armature assembly 154 and an absorber bracket 156. As shown, the cross-car beam 150 includes support ribs 158,160 positioned within aperture 152 for cooperation with the slots 162,164, respectively, of the absorber bracket 156.

Figure 35:
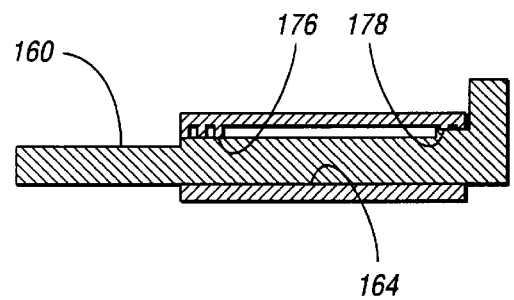
FIG. 35 shows a vertical cross-sectional view of an absorber bracket and rib in accordance with the embodiment of FIG. 31.

As illustrated schematically in the vertical cross-sectional view of FIG. 35, each slot 164 includes steps 176,178 so that the support ribs 160 are sequentially tightened as each rib 160 is inserted into the respective slot 164.

Figure 32:
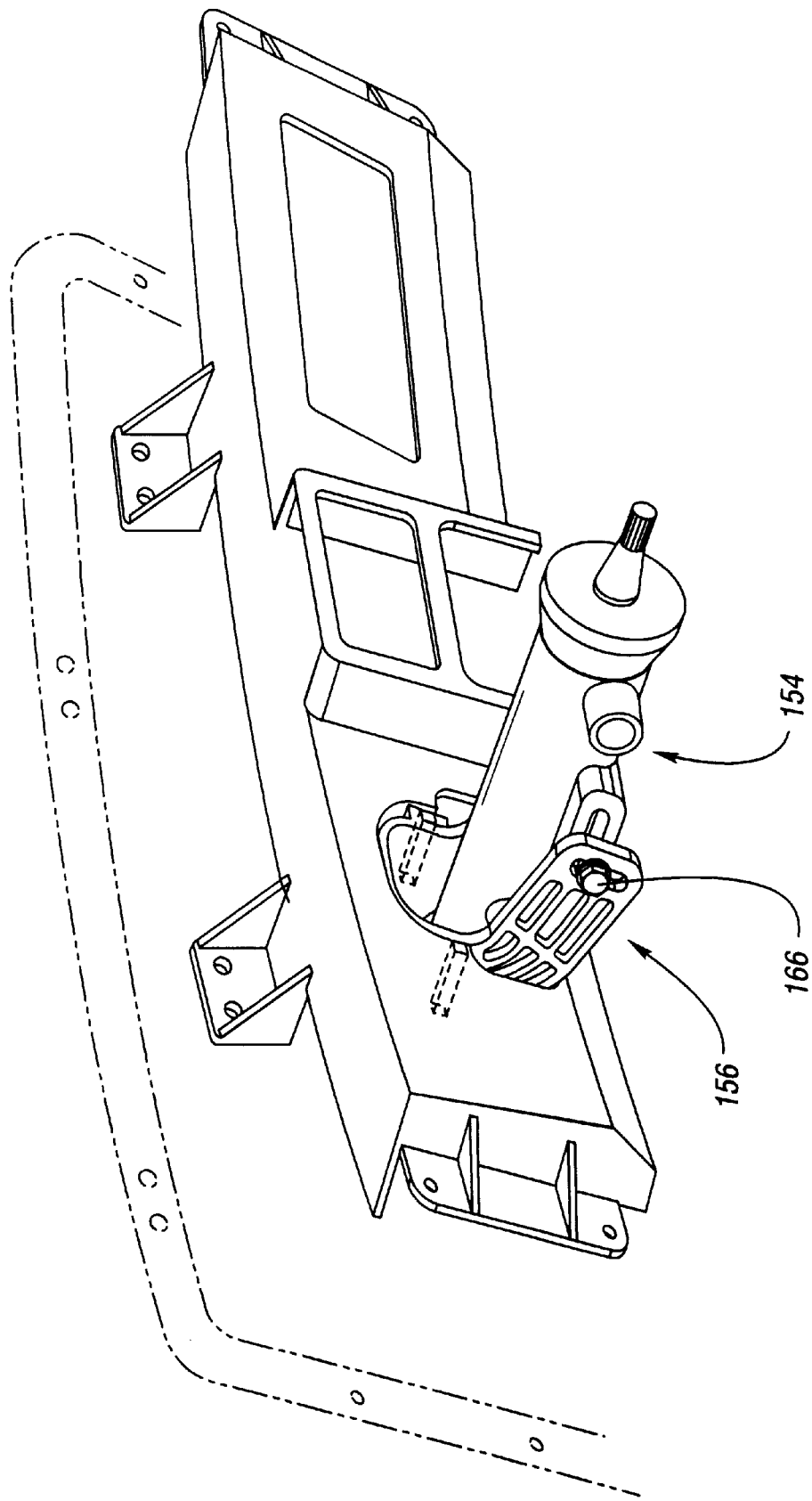
FIG. 32 shows a schematic perspective view of the components of FIG. 31 in the assembled position.

As shown in FIG. 32, a bolt 166 attaches the steering column armature assembly 154 to the absorber bracket 156.

Figure 33:
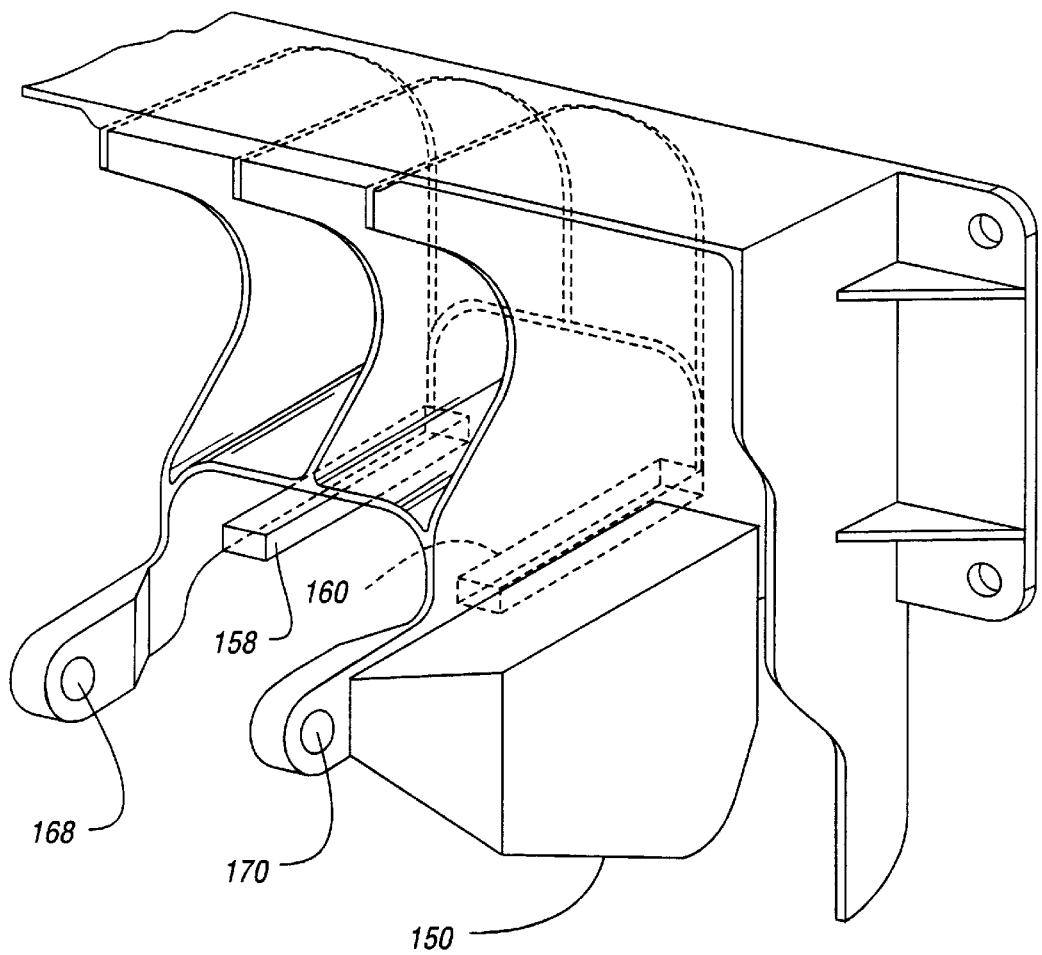
FIG. 33 shows a partial perspective view of a cross-car beam corresponding with the embodiment of FIG. 31.
Figure 34:
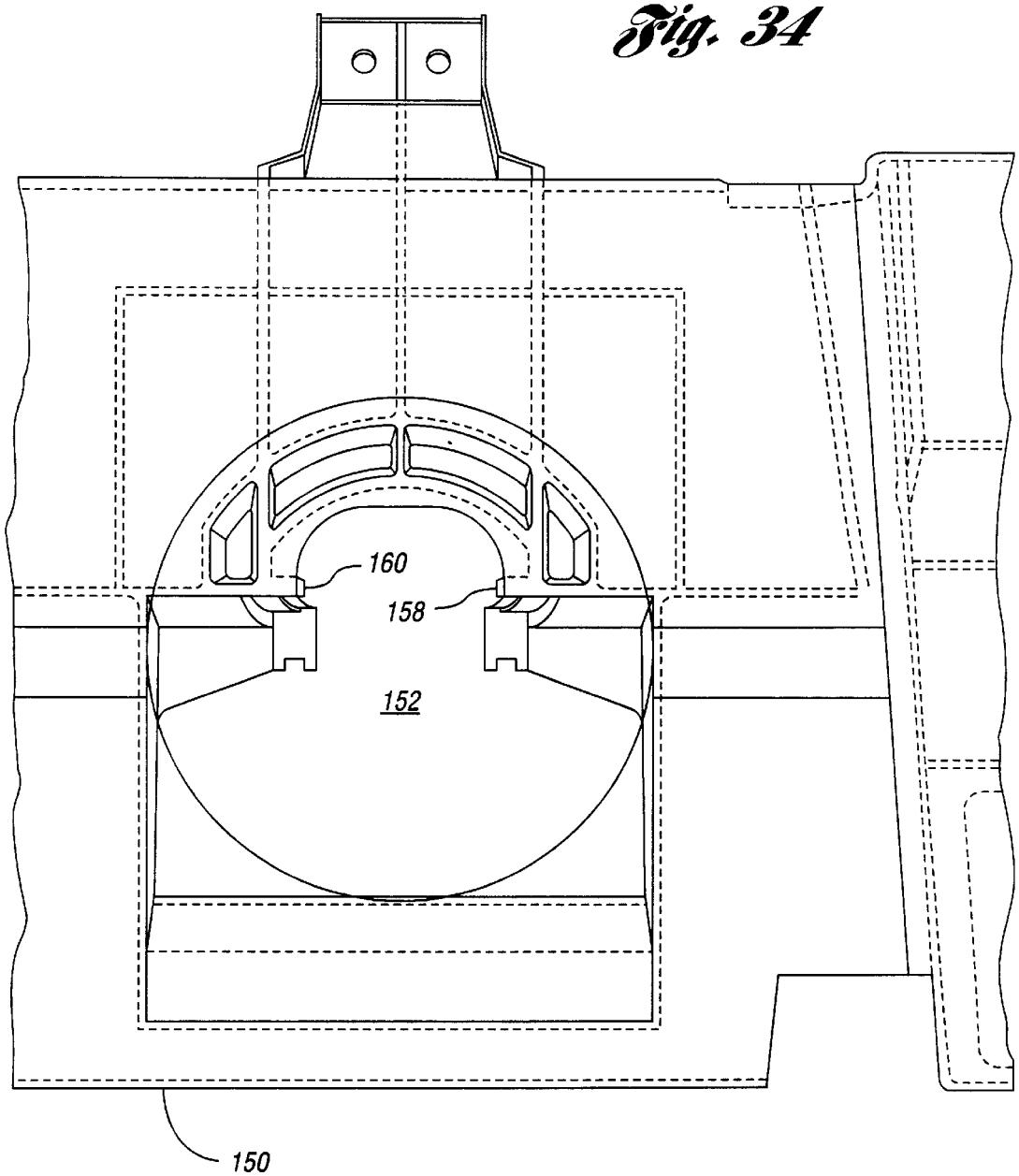
FIG. 34 shows a front view of the cross-car beam of FIG. 33.

A rear perspective view of the cross-car beam 150 is shown in FIG. 33. The cross-car beam 150 includes apertures 168,170 to which the pivot joint 172 of the steering column armature assembly 154 is attached.

An energy absorbing curl strap (not shown) is connected between the absorber bracket 156 and the cross-car beam 150 for dissipating energy as the internally collapsing steering column armature assembly 154 is collapsed in a high energy impact.

While the best modes for carrying out the invention have been described in detail, those familiar with the art to which this invention relates will recognize various alternative designs and embodiments for practicing the invention within the scope of the appended claims.

What is claimed is:

1. A vehicle having first and second A-pillars, the vehicle comprising:

a cross-car beam connecting the first and second A-pillars of the vehicle;

a steering column armature assembly positioned within the vehicle and including at least one pivot joint; and a single attachment component directly connecting said pivot joint to the cross-car beam.

2. The vehicle of claim 1, wherein said single attachment component is further operative as a steering column housing.

3. The vehicle of claim 1, wherein said cross-car beam comprises an aperture formed therethrough for receiving the steering column armature assembly, and said single attachment component comprises a gear pivotally connected coaxially with said pivot joint and having gear teeth engaged with a gear rack formed integrally with the cross-car beam for pivotally mounting the pivot joint with respect to the cross-car beam.

4. A vehicle comprising:

a cross-car beam connected at opposing ends to the first and second A-pillars of the vehicle, said cross-car beam having an aperture formed therethrough; and a steering column armature assembly slidably received within said aperture and supported by the cross-car beam.

5. The vehicle of claim 4, wherein said cross-car beam comprises a one-piece cast component with a gear rack formed integrally therewith, and said steering column armature assembly includes a gear engaged with the gear rack.

6. A vehicle having first and second A-pillars, the vehicle comprising:

a cast, one-piece cross-car beam connected at opposing ends to the A-pillars, and said cross-car beam having an aperture formed therethrough and having a gear rack formed integrally with the cross-car beam; and a steering column armature assembly slidably received within said aperture and supported by the cross-car beam, said steering column armature assembly including a gear engaged with said gear rack.

* * * * *